US007284239B1

(12) United States Patent
Young et al.

(10) Patent No.: US 7,284,239 B1
(45) Date of Patent: Oct. 16, 2007

(54) TRANSFORMING SERVER-SIDE PROCESSING GRAMMARS

(75) Inventors: Jeff Young, San Jose, CA (US); H. Scott Roy, San Jose, CA (US); Jean Young, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 825 days.

(21) Appl. No.: 09/587,770

(22) Filed: Jun. 6, 2000

(51) Int. Cl.
*G06F 9/44* (2006.01)
*G06F 17/00* (2006.01)

(52) U.S. Cl. ....................................... 717/137; 715/513

(58) Field of Classification Search ................ 717/115, 717/117, 136, 137, 139–143, 146, 147; 707/501.1, 707/513, 517, 522–524
See application file for complete search history.

(56) References Cited

U.S. PATENT DOCUMENTS 6,012,098 A * 1/2000 Bayeh et al. ............... 709/246
6,154,738 A * 11/2000 Call ........................... 707/513
6,263,332 B1 * 7/2001 Nasr et al. ..................... 707/5
6,466,940 B1 * 10/2002 Mills .......................... 707/102

OTHER PUBLICATIONS

Adam S. Cartwright, "15 Seconds: Server-Side XML in ASP," [online] May 27, 1999 [Accessed Nov. 19, 2002], Retrieved from Internet <URL: http://www.15seconds.com/issue/990527.htm>, pp. 1-5.*

James Clark, "XT Version 19991105," [online] 1999 [Accessed Nov. 19, 2002], Retrieved from Internet <URL: http://www.jclark.com/xml/xt-old.html>, pp. 1-6.*

James Clark, ed., "Associating stylesheets with XML documents; W3C Proposed Recommendation Apr. 28, 1999," Apr. 1999, W3C, pp. 1-4.*

Paul Enfield, "Using Server-Side XSL for Early Rendering: Generating Frequently Accessed Data-Driven Web Pages in Advance," Apr. 2000, MSDN Magazine, pp. 1-5.*

"How to Use asp2php," Jun. 4, 2000 [online], accessed Dec. 20, 2006, retrieved from Internet <URL: http://web.archive.org/web/20000604111218/asp2php.naken.cc/howto.html>, (2 pages).*

"Typical Questions/COmments about asp2php," Jun. 4, 2000 [online], accessed Dec. 20, 2006, retrieved from Internet <URL: http://web.archive.org/web20000604075612/asp2php.naken.cc/faq.html>, (2 pages).*

World Wide Web Consortium Issues XSL Transformations (XSLT) and XML Path Language (Xpath) as Recommendations, http://www.w3.org/1999/11/xslt-xpath-pr, World Wide Consortium, pp. 1-3.

XML in 10 points, http://www.w3.org/1999/11/xslt-xpath-pr, World Wide Consortium, pp. 1-3.

XSL Transformations (XSLT), http://www.w3.org/1999/11/xslt-xpath-pr, World Wide Consortium, pp. 1-92.

* cited by examiner

*Primary Examiner*—Tuan Dam
*Assistant Examiner*—Eric B. Kiss
(74) *Attorney, Agent, or Firm*—Fish & Richardson P.C.

(57) ABSTRACT

A translator for translating server-side instructions includes a set of rules for translating server-side instructions from a first grammar to a second different grammar and a translation engine, such as an extensible style-sheet language translator (XSLT), for translating the server-side instructions based on the set of rules.

36 Claims, 7 Drawing Sheets

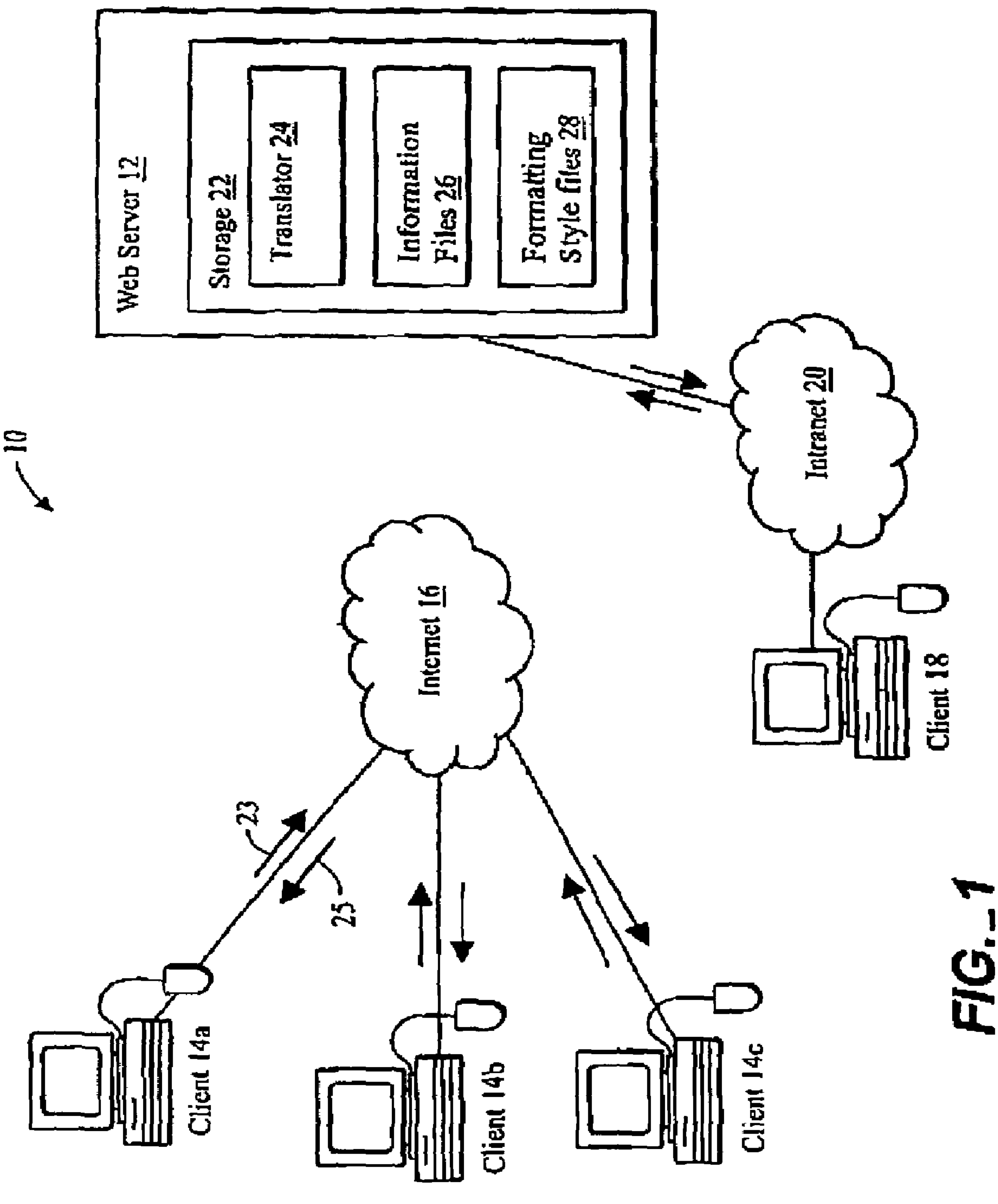
FIG._1

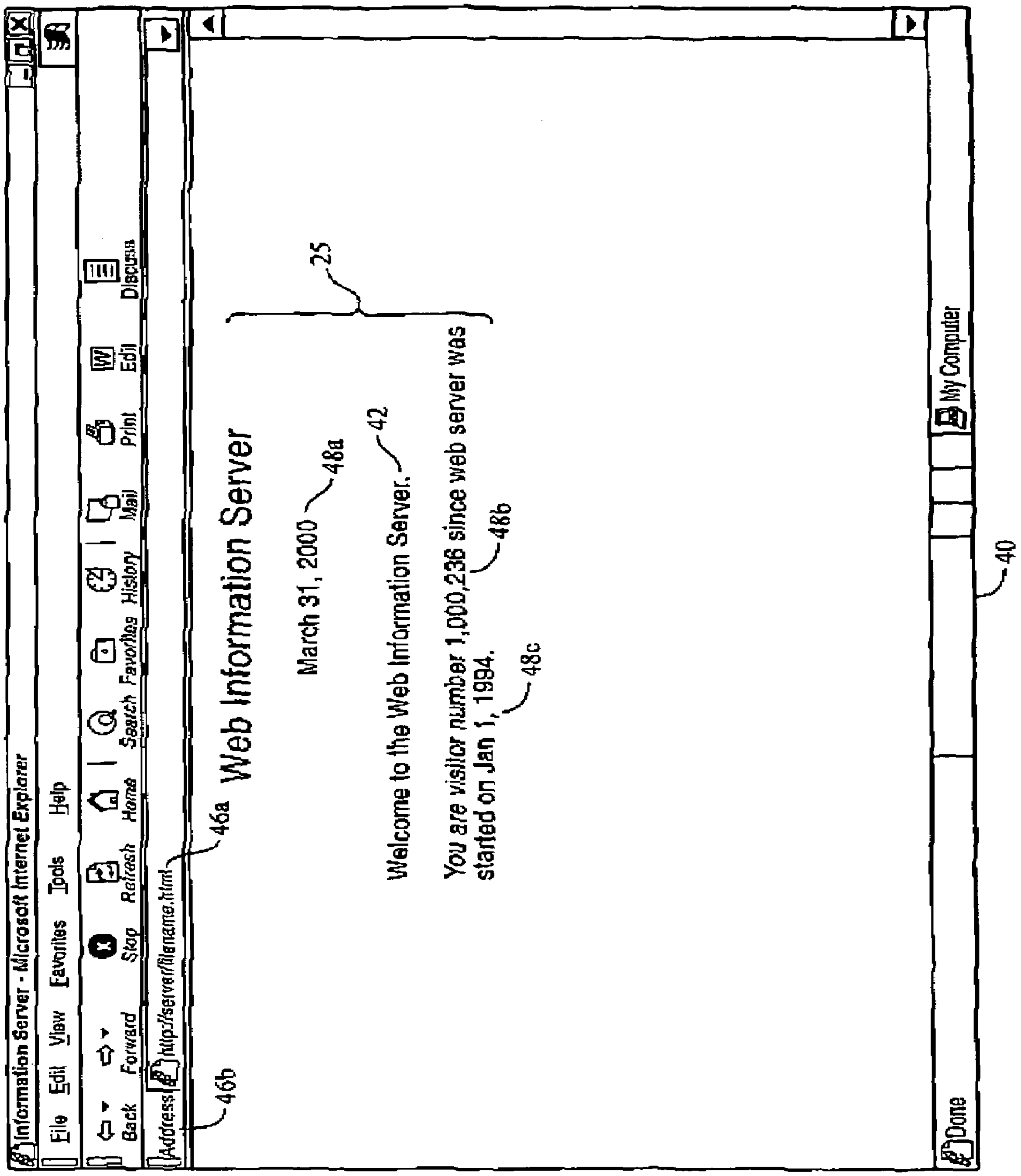
FIG._2

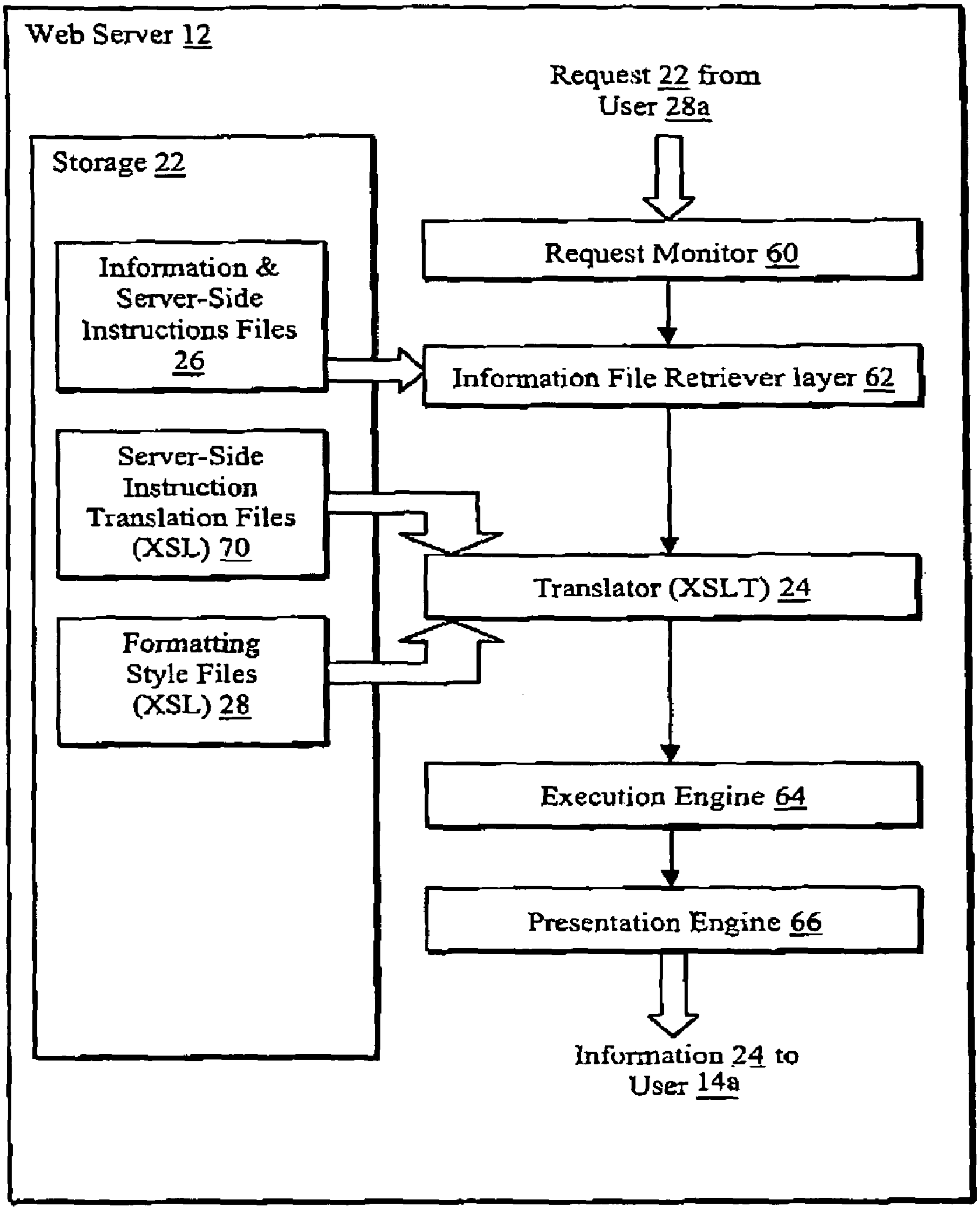
FIG._3

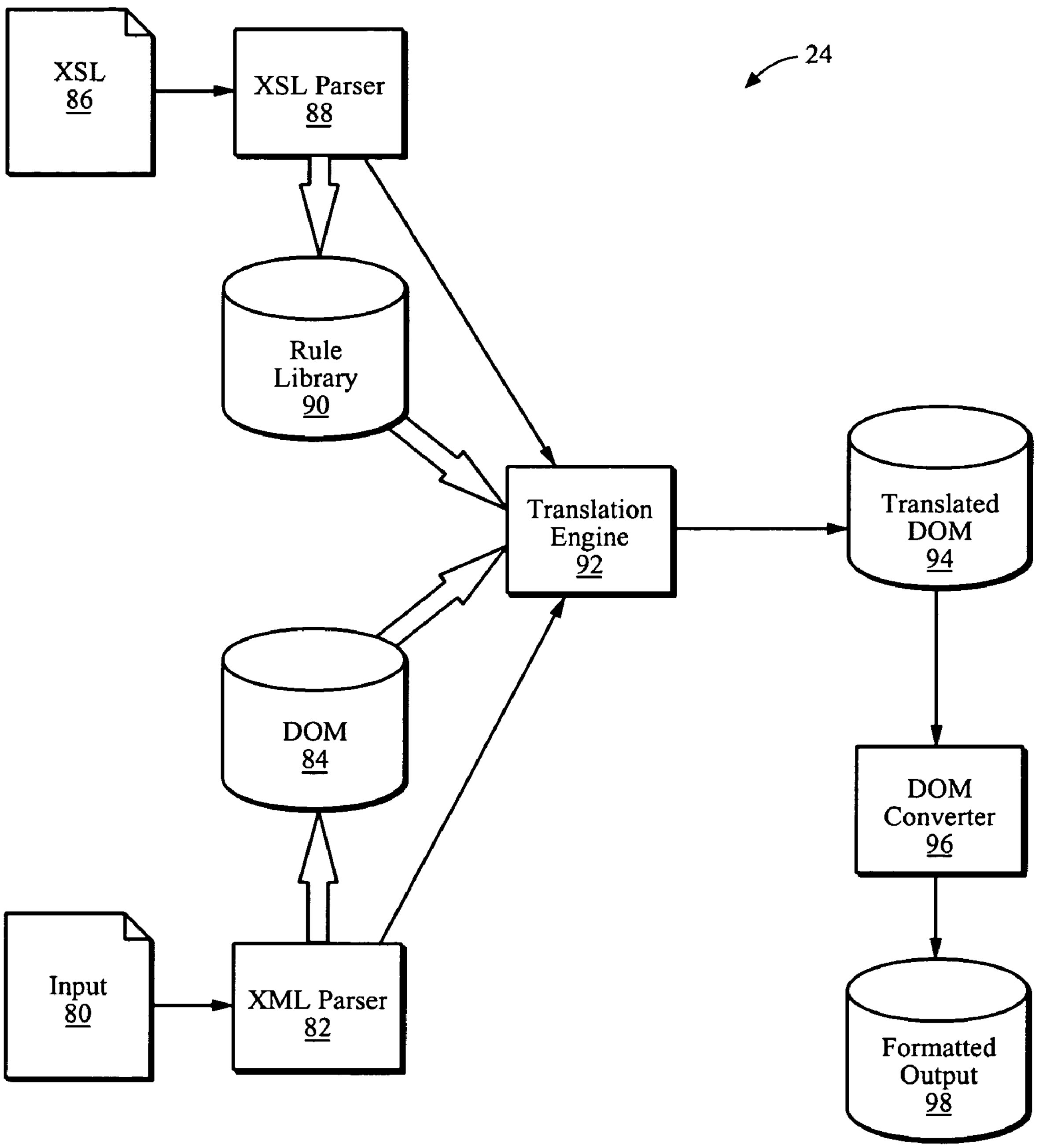
FIG._4

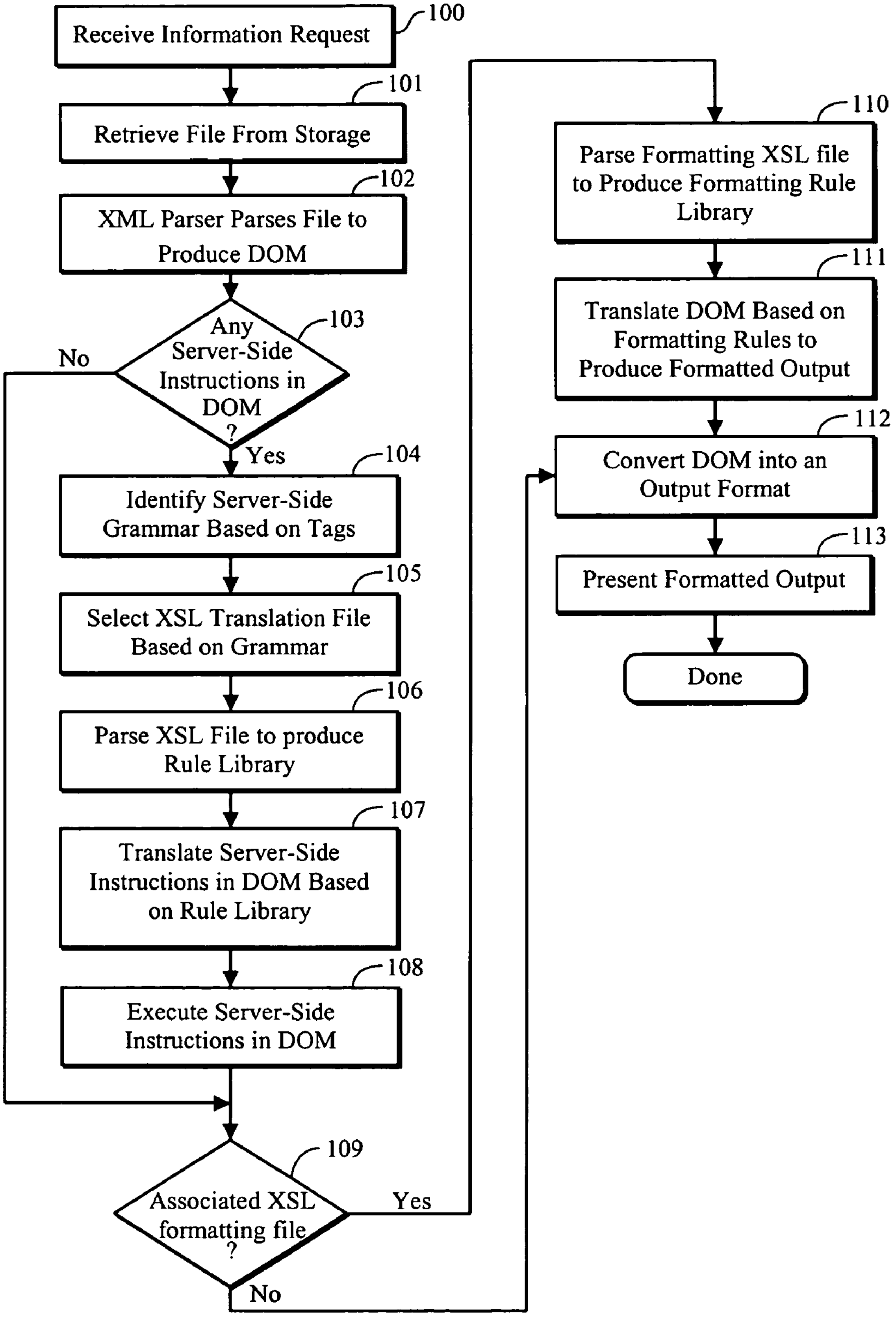
FIG._5

FIG._6A

```
<span madcowsource="foo" madcowfield="bar"> . . . </span>   131
```

FIG._6B

```
<xsl : stylesheet . . . >

. . .

< ! - -  Match any <span> with attributes 'madcowsource' and 'madcowfield' .  -->   121b
< ! - -  Replace the span element node with "<%=foo.Value("bar") %>        -->   122b
< ! - -  where 'foo' and 'bar' are evaluated from the values of the        -->   123b
< ! - -  madcow attributes on the current <span> node.                     -->   124b
< ! - -  Do not process child nodes of the span i.e. discard them.         -->   125b

<xsl : template match="span[@madcowsource and @madcowfield]">   121a
   <xsl : text disable-output-escaping="yes"><%=</xsl:text>   122a
   <xsl : value-of select="@madcowsource"/>   123a
   <xsl : text>.Value("<=xsl : text>   124a
   <xsl : value-of select="@madcowfield"/>   125a
   <xsl : text disable-output-escaping="yes">")%></xsl : text>   126a
</ xsl : template>   127a

. . .

</xsl : stylesheet>   128a
```

FIG._6C

```
<%=foo.Value("bar")%>   132
```

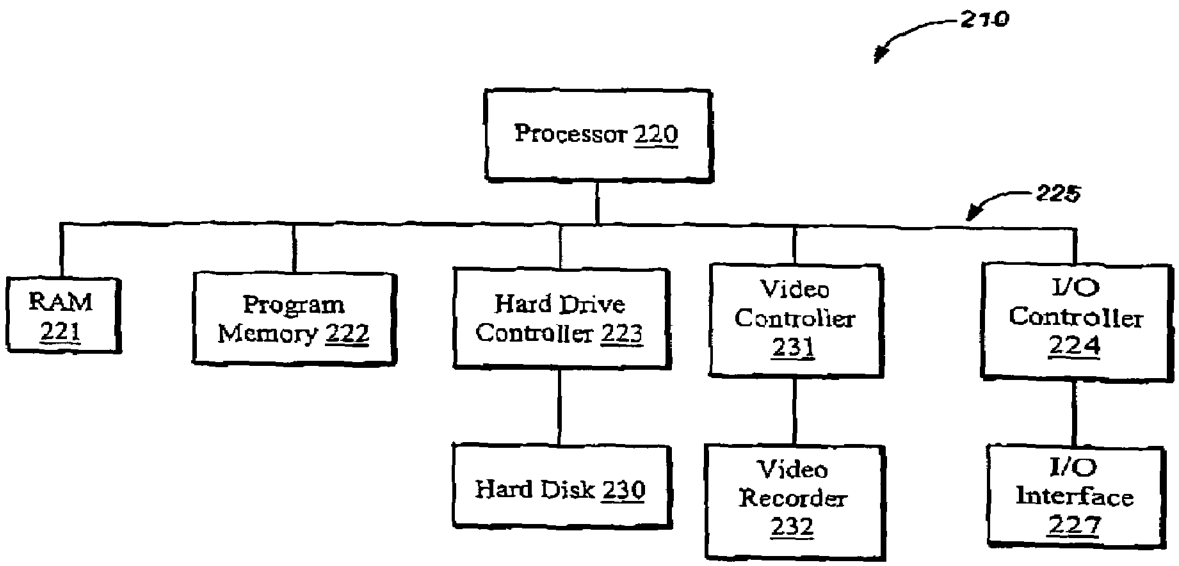
FIG._7

TRANSFORMING SERVER-SIDE PROCESSING GRAMMARS

BACKGROUND

The present invention relates to server-side executable instructions.

Information servers, such as web servers, present information to users, for example, over a network. The network may be the Internet, an extranet, or an intranet. Examples of information servers include web, ftp and gopher servers. The users may view the presented information using client software, such as a web browser, on a client computer that is connected to the information server by a network.

The information may be generally divided into static information and dynamically generated information. The static information is produced and stored in an information file that is contained within a storage area associated with the information server. The server retrieves the information file from the storage area prior to presenting it to the user. The storage file may be a hypertext markup language (HTML) file, a structured generalized markup language (SGML) file, an extensible markup language file (XML), and so forth. The information file may be associated with formatting information stored in a separate formatting file. The formatting information specifies such formatting properties as a size or type of a font, etc. The formatting file may be represented in the extensible style sheet language (XSL), which is a declarative language for representing formatting information. An XSL translator (XSLT) applies the formatting contained within the XSL file to the information file to produce the formatted information presented to the user.

The information server executes a set of server-side instructions to generate the dynamic information just before it is presented to a user. For example, the server side instructions may direct the web server to present the data and time to a user, or even the number of times that a particular page of information has been presented to users. More complex server side instructions may retrieve information, such as a product catalog for an Internet merchant, from a database management system (DBMS) for presentation to a user. An interpreter on the server may interpret server-side instructions represented in a grammar corresponding to the interpreter to generate the dynamic content.

A variety of grammars are available for representing server-side instructions, e.g., server-side includes (SSI), PHP, Active Server Pages∩ (ASP) by Microsoft Inc., and Java Server pages™ (JSP) by Sun Microsystems Inc. The server-side instructions may be stored in a server side file or they may be embedded within an information file that also contains static information. Embedded server-side instructions are typically contained between a starting tag and an ending tag to delineate the instructions from the static information. The starting tag and ending tag are special strings that are only used to indicate the beginning and ending of a sequence of server-side instructions. For example, the strings "< %" and "% >" are used to indicate the beginning and the ending of a sequence of server-side instructions.

SUMMARY

In general, a first aspect of the invention relates to a translator for translating server-side instructions. The translator includes a set of rules for translating server-side instructions from a first grammar to a second different grammar and a translation engine for translating the server-side instructions based on the set of rules.

In general, a second aspect of the invention relates to an information server for presenting information. The information server includes a translator for translating server-side instructions, an execution engine for executing the translated server side instructions to generate information, and a presentation engine for presenting the generated information. The translator may be implemented according to the first aspect of the invention.

Embodiments of the first and second aspect of the invention may include one or more of the following features. The set of rules is in the extensible style sheet language and the translation engine is an extensible style sheet language translator. The translator includes a parser for parsing server-side instructions into an intermediate syntax and the translation engine is configured to translate the parsed server-side instructions. The translator includes a second set of rules for translating information content and the translation engine is configured to translate the information content based on the second set of rules. Either the first grammar or the second grammar is selected from a group that includes Active Server Pages, Java Server Pages, Server Side Includes, Vbscript, and Jscript. The translator includes a second set of rules translating server side instructions from a third grammar to another grammar, e.g. the second grammar, and the parser is further configured to parse the server-side instructions into the intermediate syntax.

In general, a third aspect of the invention relates to a method implemented in a computer program application for presenting information. The method includes translating server-side instructions based on a set of rules for translating instructions from a server-side instruction grammar to a second server-side instruction grammar, executing the translated server side instructions to generate information, and presenting the generated information. The method may include, prior to the translating, parsing the server-side instructions to identify a grammar associated with the set of instructions, and selecting the set of rules based on the identified grammar.

In general, a fourth aspect of the invention relates to computer program product, tangibly stored on a computer-readable medium, for presenting information. The product includes instructions operable to cause a programmable processor to translate server-side instructions based on a set of rules for translating instructions from a first server-side instruction grammar to a second different server-side instruction grammar, execute the translated server side instructions to generate information, and present the generated information.

In general, a fifth aspect of the invention relates to a translator for translating server-side instructions. The translator includes a set of rules for translating server-side instructions from a first grammar to a second different grammar, and a computer program product, tangibly stored on a computer readable medium, comprising instructions operable to cause a programmable processor to translate the server-side instructions based on the set of rules.

Advantages of the invention can include one or more of the following.

The translator allows server-side instructions written in a first processing grammar to be executed on a server that is configured to execute server-side instructions in a second different processing grammar. Using a parser to detect the processing grammar associated with embedded server-side instructions allows the translator to translate server side instructions from multiple processing grammars. By using XSL to represent the rules for translating the processing grammar, the same XSL translator that is used to translate formatting styles is used to translate the server-side instructions, reducing cost and complexity of the translator.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 1 is a block diagram of a network with a web server, including a server-side instruction translator;

FIG. 2 shows a web page that displays the information presented by the web server in FIG. 1;

FIG. 3 is a block diagram of the web server in FIG. 1 showing the server-side instruction translator;

FIG. 4 is a block diagram depicting details of the server-side instruction translator of FIG. 3;

FIG. 5 is a flow chart showing operations of the web server of FIG. 3;

FIG. 6A shows an exemplary segment of server-side instructions in a particular grammar;

FIG. 6B shows an exemplary segment of an extensible style sheet (XSL) file containing rules for translating the server-side instructions of FIG. 6A and ASP™ instructions; and FIG. 6C shows the results of translating the segment of server-side instructions of FIG. 6A with the rules of FIG. 6B.

FIG. 7 is a block diagram of an exemplary computer system that can be used to implement the web server of FIG. 3.

DETAILED DESCRIPTION

Referring to FIG. 1, a network system 10 includes a web server 12 that presents information to users at client system 14*a*-14*c* over the Internet 17 and to a user at a client system 18 over an intranet 20. The users at the client systems 14*a*-14*c*, and 18 send information requests 23 over the network 10 to which the web server 12 responds by presenting the requested information 25 to the requesting user. The information 25 is stored within information files 26 that are stored within storage 22 associated with the web server 12.

Storage 22 may be a CDROM, disk drive, disk drive array, floppy disk, magneto-optical disk, etc. Storage 22 also contains a translator 24 and formatting style files 28 for translating the information files 26 so that the translated files contain formatting information.

Referring to FIG. 2, a user at a client system 14*a*-14*c*, 18 requests information by typing a uniform resource location (URL) 46*a* of an information file 26 that contains the information into a dedicated address field 46*b* of a web browser 40. The web browser 12, responds to the information request by presenting the requested information 25 over the network 10. The information 25 is displayed on the user's web browser 40. The presented information contains static information, for example line 42, which is stored in a storage area associated with the web server 12. Additionally, the presented information includes dynamic information 48*a*-48*c* that is generated by the server after receiving the request for information. The dynamic information includes the current date 48*a*, the number of requests that have been received for the page 48*b*, and so forth.

The web server 12 supplies requested information 25 that is retrieved from information files 26, contained within storage 22, before it is presented at a client system 14*a*. Certain information file formats, such as XML, allow the formatting style of the information to be stored in a separate file, i.e. the formatting style file 28. The formatting style file 28 is stored separately from the information file 26. The formatting style file 28 is known as a style sheet and the file 26 can be represented in the extensible style sheet language (XSL), a cascading style sheet (CSS), and so forth. The information file 26 contains high level formatting markers, such as "major heading", "sub-heading", and "quotation" to indicate the formatting style to apply to the sections of the document. The actual formatting associated with high-level formatting marker is defined in the style sheet file 28. For example, the style sheet file 28 may define "major heading" to include both bold typeface and underlining. The style sheet translator 24, such as an extensible style sheet language translator (XSLT) is used to translate the high level formatting markers into the corresponding formatting styles, as defined in the style sheet file.

Referring to FIG. 3, the server side translator 24 resides on a web server 12 on storage medium 22. The web server 12 also includes a request monitor 60, an information file retriever layer 62, an execution engine 64, and a presentation engine 66. The request monitor 60 receives an information request 23 from a client system 14*a* over an Internet Protocol (IP) port associated with the web server 12. The monitor 60 invokes the other components of the web server 12 to fulfill the received information request.

The storage medium 22 is used to store information files 26 that may contain static information or server side instruction for dynamically generating information. Alternatively, the information files 26 may contain server side instructions embedded within static information. Storage 22 also contains formatting style files 28, which specify how the information files should be translated to convert the information files into an output format. The formatting style files are represented in XSL. Storage 22 also contains translation files 70 that specify a set of rules for translating a particular server-side grammar to another server side grammar. The set of rules is also represented in XSL. A different translation file 70 represents the conversion rules for each pair of server-side grammars. Alternatively, translation information for different grammars may be combined in the same file or stored in a database management system.

The translator 24 is an XSL translator that uses XSL translation files 70 to translate server side instructions contained within information files 26 from one server side grammar into a server side grammar that the execution engine 64 can execute ("execution grammar"). The translator 24 also translates static content in the information files to include formatting information contained within XSL formatting style files 28. The translator contains a set of routines that perform translation functions. The software module is written using the Internet Server Application Programming Interface (ISAPI™), although other application programming interfaces such as Netscape Server Application Programming Interface (NSAPI™), or Common Gateway Interface (CGI) may be used instead.

The execution engine 64 is an interpreter that executes server side instructions written in an execution grammar to dynamically generate information. The server side instructions may have originally been written in a different server-side grammar and then translated by the translator 24 into the execution grammar. The interpreter is a software module, which is also written using the Internet Server Application Programming Interface (ISAPI™).

The presentation engine 66 presents both static information content and the dynamic information content from the execution engine to a user. The presentation engine conforms to the Hypertext Transfer Protocol (HTTP) protocol of presenting information. Consequently, a user may view the presented information using an HTTP compliant web browser such as Netscape Communicator or Internet Explorer.

Referring to FIG. 4, the translator 24 will be described. The translator 24 includes an XML parser 82 that parses an input 80, such as from information file 26 from the web server, to produce a document object model (DOM) 84. The XML parser also searches for server-side instruction tags in the input 80 to determine whether the input contains server side instructions. If the input contains server-side instructions, the XML parser determines the grammar the instructions are represented in The translator 24 also includes an XSL parser 88 that parses an XSL file 86 representing a set of rules for translating the input 80. The XSL file 86 may be a server-side instruction translation file 70 specifying how server side instructions contained in the input 80 should be translated. Alternatively, the XSL file 86 may be a formatting style file 28 specifying how to translate high-level formatting markers into formatting associated with the input file 80. The XSL parser generates a rule library 90, based on the XSL file 86.

The translation engine 92, which is an XSL translator, translates the document object model 80 based on the rule library 90 to produce a translated document object model 94. A DOM converter 96 converts the translated document object model 94 into a formatted output 98.

Referring to FIG. 5, when the request monitor 60 receives 100 an information request 23, the translator 24 retrieves 101 an information file 26 from storage 22 corresponding to the information request. The XML parser 82 parses 102 the information file 26 to produce a document object model 84. The XML parser 82 then examines the document object model 84 to determine 103 whether the model contains any server-side instructions, by matching sections of the model with beginning and ending tags of known server-side instruction grammars.

If the model 84 does not contain server-side instructions, the web server 12, determines 109 whether the model 84 has an associated XSL formatting file. If the model 84 contains server-side instructions, the XML parser 82 identifies 104 the grammar of the server-side instructions based on the beginning and ending tags of the instructions. The XML parser 82 selects 105 an XSL translation file 70 for translating the grammar of the server-side instructions, based on the identified grammar. The XSL parser 88 parses 106 the selected XSL translation file 70 to produce a rule library 90. The translation engine 92 translates 107 the server side instructions in the DOM 84 based on the rule library 90 to produce server-side instructions that can be executed by the execution engine 64. The execution engine 64 executes 108 the translated instructions to produce dynamic information, which is incorporated into the document object model 84.

The XML parser 82 examines the document object model 84 to determine 109 whether the model 84 is associated with an XSL formatting style file 28. If the document object model 84 is not associated with a formatting style file 28, the web server converts 112 the document object model 84 to an output format 98. Otherwise if the document object model 84 is associated with a formatting file style, the XSL parser 88 parses 110 the formatting style to produce a formatting rule library 90. The translation engine 92 translates 111 the document object model 84 based on the formatting rule library 90 to produce a translated document object model 94.

The document object model converter 96 converts 112 the model into a formatted output 98, which the presentation engine 66 presents at a client system 14*a*, for example, over the Internet.

Referring to FIGS. 6A-6C, translation of a server-side instruction 131 (FIG. 6A) from an alternate grammar to an ASP grammar will be described. XSL lines 121*a*-128*a* show a segment of the XSL translation file needed to convert the alternate grammar into the ASP grammar. Comment lines 121*b*-125*b* describe the meaning of the XSL lines. The XSL line 121*a* directs the XSL translator to match any line that contains the two keywords "madcowsoure" and "madcowfield". Line 122*a* directs the translator to print out the text string "<%=", which is an ASP server-side keyword. Line 123*a* directs the XSL translator to print out the value of the variable "madcowsource", which is specified in line 131 (FIG. 6A) to be "foo". Line 124*a* directs the translator to print out the text string. "Value("", while line 125*a* directs the translator to print the value of the variable "madcowfield", which is specified in line 131 (FIG. 6A) to be "bar". Line 126*a* directs the translator to print out the string "")%>". The result of the translation, which is shown in line 132 of FIG. 6C, complies with the ASP grammar.

The process for defining a complete XSL file for translating between the two grammars can be inferred from the above example.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a complied or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

An example of one such type of computer is shown in FIG. 7, which shows a block diagram of a programmable processing system (system) 210 suitable for implementing or performing the apparatus or methods of the invention. The system 210 includes a processor 220, a random access memory (RAM) 221, a program memory 222 (for example, a writable read-only memory (ROM) such as a flash ROM), a hard drive controller 223, a video controller 231, and an input/output (I/O) controller 224 coupled by a processor (CPU) bus 225. The system 210 can be preprogrammed, in ROM, for example, or it can be programmed (and reprogrammed) by loading a program from another source (for example, from a floppy disk, a CD-ROM, or another computer).

The hard drive controller 223 is coupled to a hard disk 230 suitable for storing executable computer programs, including programs embodying the present invention, and data including the storage 22 (FIG. 3). The video controller 231 is coupled to a video recorder 232, which can be used for storing and importing video footage and for writing final output. The I/O controller 224 is coupled by means of an I/O bus 226 to an I/O interface 227. The I/O interface 227 receives and transmits data (e.g., stills, pictures, movies, and animations for importing into a composition) in analog or digital form over communication links such as a serial link, local area network, wireless link, and parallel link A number of embodiments of the invention have been described. Nevertheless, it will be understood that various modifications may be made without departing from the spirit and scope of the invention. For example, the information server does not have to be a web server. It could be a gopher server, an FTP server, or any other information server. In fact, the translator does not have to be integrated in an information server. Instead, the translator may be a separate software module for translating server-side instruction files and storing the server side instructions in a storage area of an information server to reduce the processing requirements of the information server. The translator may be integrated in a content preparation tool to allow content developers to produce server-side instructions in multiple grammars.

The server-side instructions do not have to be embedded in static content. They could be stored in dedicated server-side instruction files. The translation file has been described as an XSL file. However, any of the translation file formats known in the art, such as cascading style sheets (CSS), may be used instead so long as the translation engine corresponds to the translation file.

Accordingly, other embodiments are within the scope of the following claims.

What is claimed is:

1. A computer program product, tangibly stored on a computer-readable medium, for translating server-side instructions, comprising instructions operable to cause a programmable processor to provide:

a set of rules for translating first server-side instructions in a first server-side grammar to second server-side instructions in a second different server-side grammar, the first and second server-side instructions each being executable on a server, the instructions when executed on the server generating information dynamically on the server for transmission to a client, wherein the set of rules is in the extensible style sheet language; and a translation engine for translating the first server-side instructions in the first server-side grammar to second server-side instructions in the second different server-side grammar based on the set of rules, wherein the translation engine is an extensible style sheet language translator.

2. The computer program product of claim 1, further comprising:

a parser for parsing server-side instructions into intermediate instructions in an intermediate syntax and with the translation engine configured to translate the intermediate instructions, the intermediate syntax being different from the first server-side grammar and the second different server-side grammar.

3. The computer program product of claim 2, further comprising:

a second set of rules for translating information content with the translation engine further configured to translate the information content based on the second set of rules.

4. The computer program product of claim 2, further comprising:

a second set of rules for translating server-side instructions from a third server-side grammar to a fourth server-side grammar, the server-side instructions in the third server-side grammar and the fourth server-side grammar each being executable on the server, the instructions when executed generating information dynamically on the server for transmission to a client, wherein the parser is further configured to parse the server-side instructions in the third server-side grammar into the intermediate syntax.

5. The computer program product of claim 4, wherein the fourth server-side grammar is the same as the second server-side grammar and the first server-side grammar is different from the third server-side grammar.

6. The computer program product of claim 4, wherein the translation engine includes:

a grammar detector operable to detect a grammar associated with server-side instructions, the translation engine being configured to select between the first and second set of rules based on the detection.

7. A computer program product, tangibly stored on a computer-readable medium, for presenting information, comprising instructions operable to cause a programmable processor to provide:

a translator for translating first server-side instructions in a first server-side grammar to second server-side instructions in a second different server-side grammar, the first and second server-side instructions each being executable on a server, the instructions when executed generating information dynamically on the server for transmission to a client;

an execution engine for executing the second server-side instructions on the server to generate information dynamically;

a presentation engine for presenting the generated information to the client; and wherein the translator includes:

A set of rules for translating the first server-side instructions from the first server-side grammar to the second server-side instructions in the second different server-side grammar, wherein the set of rules is in the extensible style sheet language, and a translation engine for translating the first server-side instructions from the first server side grammar to the second server-side instructions in the second different server-side grammar based on the set of rules, wherein the translation engine is an extensible style sheet language translator.

8. The computer program product of claim 7, wherein the translator further includes:

a parser for parsing server-side instructions embedded in information content into intermediate instructions in an intermediate syntax, the intermediate syntax being different from the first server-side grammar and the second different server-side grammar, and with the translation engine configured to translate the intermediate instructions.

9. The computer program product of claim 8, further comprising:

a second set of rules for translating information content, with the translation engine further configured to translate the information content based on the second set of rules.

10. The computer program product of claim 7, wherein the translator includes:

a second set of rules for translating server-side instructions from a third server-side grammar to a fourth server-side grammar, the server-side instructions in the third server-side grammar and the fourth server-side grammar each being executable on the server, the instructions when executed generating information dynamically on the server for transmission to a client, and with the translation engine further configured to translate server-side instructions in the third server-side grammar based on the second set of rules.

11. The computer program product of claim 10, wherein the translator includes:

a grammar detector operable to detect a grammar associated with server-side instructions, the translation engine being configured to select between the first and second set of rules based on the detection.

12. The computer program product of claim 10, wherein the fourth server-side grammar is the same as the second server-side grammar.

13. A computer-implemented method, for presenting information, the method comprising:

translating first server-side instructions based on a set of rules for translating instructions in a first server-side instruction grammar to second server-side instructions in a second different server-side instruction grammar, the first and second server-side instructions each being executable on a server, the instructions when executed generating information dynamically on the server for transmission to a client, wherein the set of rules is in the extensible style sheet language and translating the first server-side instructions includes translating the first server-side instructions using an extensible style sheet processor;

executing the translated second server-side instructions to generate information dynamically on the server; and presenting the generated information to the client.

14. The method of claim 13, further comprising:

prior to the translating, parsing the first server-side instructions to identify a server-side grammar associated with the instructions; and selecting the set of rules based on the identified server-side grammar.

15. The method of claim 13, further comprising:

a second set of rules for translating information content; and translating the information content based on the second set of rules.

16. The method of claim 13, further comprising:

a second set of rules for translating server-side instructions from a third server-side grammar to a fourth server-side grammar, the server-side instructions in the third server-side grammar and the fourth server-side grammar each being executable on the server, the instructions when executed generating information dynamically on the server for transmission to a client; and translating the server-side instructions in the third server-side grammar based on the second set of rules.

17. The method of claim 16, wherein the fourth server-side grammar is the same as the second server-side grammar.

18. A computer program product, tangibly stored on a computer-readable medium, for presenting information, comprising instructions operable to cause a programmable processor to:

translate first server-side instructions based on a set of rules for translating instructions in a first server-side instruction grammar to second server-side instructions in a second different server-side instruction grammar, the first and second server-side instructions each being executable on a server, the instructions when executed generating information dynamically on the server for transmission to a client, wherein the set of rules is in the extensible style sheet language and the instructions for translating are operable to cause the programmable processor to translate the server-side instructions using an extensible style sheet processor;

execute the translated second server-side instructions to generate information dynamically on the server; and present the generated information to the client.

19. The computer program product of claim 18, further comprising:

a second set of rules to translate information content, with the instructions for translating being operable to cause the programmable processor to translate the information content based on the second set of rules.

20. The computer program product of claim 18, further comprising:

a second set of rules for translating server-side instructions from a third server-side grammar to a fourth server-side grammar, the server-side instructions in the third server-side grammar and the fourth server-side grammar each being executable on the server, the instructions when executed on the server generating information dynamically on the server for transmission to a client, with the instructions for translating being operable to cause the programmable processor to translate the server-side instructions in the third server-side grammar based on the second set of rules.

21. The computer program product of claim 20, wherein the fourth server-side grammar is the same as the second server-side grammar.

22. A computer program product, for translating server-side instructions, tangibly stored on a computer readable medium, comprising instructions operable to cause a programmable processor to:

retrieve a set of rules for translating first server-side instructions in a first server-side grammar to second server-side instructions in a second different server-side grammar, the first and second server-side instructions each being executable on a server, the instructions when executed generating information dynamically on the server for transmission to a client, wherein the set of rules is in the extensible style sheet language and the instructions for translating are operable to cause the programmable processor to translate the server-side instructions using an extensible style sheet processor; and translated the first server-side instructions in the first server side grammar to second server-side instructions in the second different server-side grammar based on the set of rules.

23. The computer program product of claim 22, wherein the instructions for translating are operable to cause the programmable processor to:

parse the server-side instructions into intermediate instructions in an intermediate syntax, the intermediate syntax being different from the first server-side grammar and the second different server-side grammar; and translate the intermediate instructions.

24. The computer program product of claim 22, further comprising instructions operable to cause the programmable processor to:

retrieve a second set of rules for translating information content; and translate the information content based on the second set of rules.

25. The computer program product of claim 24, wherein the fourth server-side grammar is the same as the second server-side grammar.

26. The computer program product of claim 22, further comprising instructions operable to cause the programmable processor to:

retrieve a second set of rules for translating server-side instructions from a third server-side grammar to a fourth server-side grammar, the server-side instructions in the third server-side grammar and the fourth sever-side grammar each being executable on the server, the instructions when executed on the server generating information dynamically on the server for transmission to a client; and translate the server-side instructions in the third server-side grammar based on the second set of rules.

27. A computer implemented method for translating server-side instructions, comprising:

translating first server-side instructions in a first server-side grammar to second server-side instructions in a second different server-side grammar based on a set of rules, the first and second server-side instructions each being executable on a server, the instructions when executed on the server generating information dynamically on the server for transmission to a client, wherein the set of rules is in the extensible style sheet language and translating the first server-side instructions includes translating the first server-side instructions using an extensible style sheet language translator.

28. The method of claim 27, wherein the translating the instructions includes:

parsing the server-side instructions into intermediate instructions in an intermediate syntax, the intermediate syntax being different from the first server-side grammar and the second different server-side grammar; and translating the intermediate instructions.

29. The method of claim 27, further comprising:

a second set of rules for translating information content; and translating the information content based on the second set of rules.

30. The method of claim 27, further comprising:

a second set of rules for translating server-side instructions from a third server-side grammar to a fourth server-side grammar, the server-side instructions in the third server-side grammar and the fourth server-side grammar each being executable on the server, the instructions when on the server generating information dynamically on the server for transmission to a client; and translating the server-side instructions in the third server-side grammar based on the second set of rules.

31. The method of claim 30, wherein the fourth server-side grammar is the same as the second server-side grammar.

32. A system, comprising:

a client system;

a web server operating in communication with the client system, the web server comprising:

a translator for translating first server-side instructions in a first server-side grammar to second server-side instructions in a second different server-side grammar, the first and second server-side instructions each being executable on a server, the instructions when executed generating information dynamically on the server for transmission to a client, wherein the translator includes:

a set of rules for translating the first server-side instructions from the first server-side grammar to the second server-side instructions in the second different server-side grammar, wherein the set of rules is in the extensible style sheet language, and a translation engine for translating the first server-side instructions from the first server side grammar to the second server-side instructions in the second different server-side grammar based on the set of rules, wherein the translation engine is an extensible style sheet language translator;

an execution engine for executing the second server-side instructions on the server to generate information dynamically; and a presentation engine for presenting the generated information to the client system.

33. The system of claim 32, wherein the translator further includes:

a parser for parsing server-side instructions embedded in information content into intermediate instructions in an intermediate syntax, the intermediate syntax being different from the first server-side grammar and the second different server-side grammar, and with the translation engine configured to translate the intermediate instructions.

34. The system of claim 32, wherein the translator includes:

a second set of rules for translating server-side instructions from a third server-side grammar to a fourth server-side grammar, the server-side instructions in the third server-side grammar and the fourth server-side grammar each being executable on the server, the instructions when executed generating information dynamically on the server for transmission to a client, and with the translation engine further configured to translate server-side instructions in the third server-side grammar based on the second set of rules.

35. The system of claim 34, wherein the translator includes:

a grammar detector operable to detect a grammar associated with server-side instructions, the translation engine being configured to select between the first and second set of rules based on the detection.

36. The system of claim 34, wherein the fourth server-side grammar is the same as the second server-side grammar.

* * * * *